United States Patent [19]

Hiraiwa

[11] Patent Number: 5,503,241
[45] Date of Patent: Apr. 2, 1996

[54] ELECTRICALLY POWER-ASSISTED STEERING APPARATUS

[75] Inventor: Kazuyoshi Hiraiwa, Hamamatsu, Japan

[73] Assignee: Rhythm Corporation, Shizuoka, Japan

[21] Appl. No.: 218,562

[22] Filed: Mar. 28, 1994

[30] Foreign Application Priority Data

Apr. 7, 1993 [JP] Japan .................. 5-080401

[51] Int. Cl.⁶ ...................................... B62D 5/04
[52] U.S. Cl. .............................. 180/79.1; 318/489
[58] Field of Search .................. 180/79.1, 79, 150, 180/146, 145; 318/488, 489

[56] References Cited

U.S. PATENT DOCUMENTS

| | | | |
|---|---|---|---|
| 2,775,132 | 12/1956 | Orr et al. | 180/79.1 X |
| 2,806,101 | 9/1957 | Gardes . | |
| 2,877,656 | 3/1959 | Orr | 180/79.1 X |
| 2,930,247 | 3/1960 | Zinn | 180/79.1 X |
| 3,426,863 | 2/1969 | Hanson | 180/79.1 X |
| 3,983,953 | 10/1976 | Bayle | 180/79.1 |
| 4,635,741 | 1/1987 | Morishita et al. | 180/79.1 |
| 4,660,669 | 4/1987 | Shimizu | 180/79.1 |
| 4,703,821 | 11/1987 | Shimizu | 180/79.1 |
| 4,871,039 | 10/1989 | Daido et al. | 180/79.1 |
| 4,901,831 | 2/1990 | Ito et al. | 180/79.1 |
| 4,953,651 | 9/1990 | Lescaut | 180/79.1 |
| 5,027,915 | 7/1991 | Suzuki et al. | 180/79.1 |
| 5,238,076 | 8/1993 | Aznar et al. | 180/79.1 |

Primary Examiner—Margaret A. Focarino
Assistant Examiner—F. Zeender
Attorney, Agent, or Firm—Lane, Aitken & McCann

[57] ABSTRACT

An electrically power-assisted steering apparatus comprises resilient torque transmitting means for resiliently transmitting said steering torque from said steering shaft to said rotation shaft, and a switch assembly disposed between a battery and an electric motor which is controlled by a control unit to assist the steering effort of a vehicle driver. The switch assembly is designed to automatically turn off the electric current supplied to the electric motor independently of the control unit when the steering shaft is rotated with respect to a rotation shaft such as a pinion shaft within the range of a predetermined angle. The electric motor can be certainly prevented from being erroneously driven if the control unit controlling the electric motor is damaged or operated in a wrong manner.

6 Claims, 7 Drawing Sheets

ELECTRICALLY POWER-ASSISTED
STEERING APPARATUS

FIELD OF THE INVENTION

The present invention relates to a steering control apparatus for a power-assisted vehicle steering system of a vehicle such as an automotive vehicle having steerable road wheels. More particularly, the present invention relates to an electrically power-assisted steering apparatus for controlling an electric motor which assists the steering torque applied to a steering wheel by a vehicle driver.

DESCRIPTION OF THE PRIOR ART

In general, a steering apparatus for an automotive vehicle comprises a steering wheel which has a vehicle driver apply steering torque thereto, a steering gear assembly operatively connected to the front wheels of the vehicle, and a steering shaft provided between and operatively connecting the steering wheel and the steering gear assembly for transmitting the steering torque from the steering wheel to the steering gear assembly. The vehicle driver is, however, required to apply an extremely large steering torque to the steering wheel when the vehicle is turned under the condition that the vehicle is stopped or moved at low speed. As a consequence, the recent trends in designing steering apparatus is to equip a steering apparatus with a power assisting unit for assisting the steering torque applied to the steering wheel by the vehicle driver. As an example of steering apparatus having such a power assisting unit, is well known an electrically power-assisted steering apparatus comprising an electric motor for assisting the steering torque applied to the steering wheel by the vehicle driver. Such a conventional electrically power-assisted steering apparatus further comprises a torque sensor for detecting the magnitude and the rotational direction of the steering torque applied to the steering wheel by the vehicle driver, and an electronic controller for controlling the electronic current supplied to the electronic motor on the basis of the magnitude and the rotational direction of the steering torque detected by the torque sensor. In the conventional electrically power-assisted steering apparatus, the electric motor is likely to be controlled by the electronic controller in a wrong manner if the electronic controller is damaged or erroneously operated. To avoid such problem, there has been proposed an electrically power-assisted steering apparatus comprising a safety system which includes damage detecting means for detecting the damage or erroneous operation of the electronic controller, and motor halting means for halting the electronic motor by turning off the electric current supplied to the electric motor at a time when the damage or erroneous operation of the electronic controller is detected by the motor damage detecting means. This, however, results in the fact the prior-art electrically power-assisted steering apparatus is required to be complicated in overall construction and thus leads to be expensive.

The present invention contemplates the elimination of the drawbacks inherent in the prior-art electrically power-assisted steering apparatus and provision of the improvement of the electrically power-assisted steering apparatus.

SUMMARY OF THE INVENTION

According to one aspect of the present invention there is provided an electrically power-assisted steering apparatus comprising a steering shaft rotatable with a steering wheel and rotated about its center axis with respect to a vehicle body in opposite first and second rotational directions under the influence of steering torque applied to the steering wheel by a vehicle driver, a rotation shaft operatively connected to front wheels of a vehicle and rotatable in the first and second rotational directions about its center axis which is in axial alignment with the center axis of the steering shaft, resilient torque transmitting means for resiliently transmitting the steering torque from the steering shaft to the rotation shaft in a manner to permit the steering shaft to be rotated relatively with respect to the rotation shaft in the first and second rotational directions within the range of a first predetermined angle, an electric motor having first and second terminals electrically connected selectively to plus and minus terminals, respectively, of a battery and to the minus and plus terminals, respectively, of the battery, the electric motor being operatively connected to the rotation shaft for assisting the steering torque applied to the steering wheel by the vehicle driver, the rotation shaft being rotated by the electric motor in the first rotational direction when the first and second terminals of the electric motor are electrically connected to the plus and minus terminals, respectively, of the battery, and the rotation shaft being rotated by the electric motor in the second rotational direction when the first and second terminals of the electric motor are electrically connected to the minus and plus terminals, respectively, of the battery, and a switch assembly including first and second motor side contact elements electrically connected to the first and second terminals, respectively, of the electric motor, and first and second battery side contact elements electrically connected to the plus and minus terminals, respectively, of the battery, the first and second motor side contact elements being supported by one of the steering shaft and the rotation shaft, and the first and second battery side contact elements being supported by the other of the steering shaft and the rotation shaft, wherein the steering shaft is rotatable with respect to the rotation shaft to assume three differential rotational positions consisting of a first rotational position in which the steering shaft is rotated in the first and second rotational directions with respect to the rotation shaft within the range of a second predetermined angle smaller than the first predetermined angle, a second rotational position in which the steering shaft is rotated in the first rotational direction with respect to the rotation shaft at a rotational angle beyond the range of the second predetermined angle, and a third rotational position in which the steering shaft is rotated in the second rotational direction with respect to the rotation shaft at a rotational angle beyond the range of the second predetermined angle, the first and second motor side contact elements being held in spaced and non-contact relationship to the first and second battery side contact elements when the steering shaft assumes the first rotational position, so that the electric motor is halted, the first and second motor side contact elements being respectively brought in contact with the first and second battery side contact elements when the steering shaft is rotated to assume the second rotational position, so that the electric motor is driven to rotate the rotation shaft in the first rotational direction, and the first and second motor side contact elements being respectively brought in contact with the second and first battery side contact elements when the steering shaft is rotated to assume the third rotational position, so that the electric motor is driven to rotate the rotation shaft in the second rotational direction.

According to another aspect of the present invention there is provided an electrically power-assisted steering apparatus comprising a steering shaft rotatable with a steering wheel and rotated about its center axis with respect to a vehicle body in opposite first and second rotational directions under the influence of steering torque applied to the steering wheel by a vehicle driver, a rotation shaft operatively connected to front wheels of a vehicle and rotatable in the first and second rotational directions about its center axis which is in axial alignment with the center axis of the steering shaft, resilient torque transmitting means for resiliently transmitting the steering torque from the steering shaft to the rotation shaft in a manner to permit the steering shaft to be rotated relatively with respect to the rotation shaft in the first and second rotational directions within the range of a first predetermined angle, an electric motor having first and second terminals electrically connected selectively to plus and minus terminals, respectively, of a battery and to the minus and plus terminals, respectively, of the battery, the electric motor being operatively connected to the rotation shaft for assisting the steering torque applied to the steering wheel by the vehicle driver, the rotation shaft being rotated by the electric motor in the first rotational direction when the first and second terminals of the electric motor are electrically connected to the plus and minus terminals, respectively, of the battery, and the rotation shaft being rotated by the electric motor in the second rotational direction when the first and second terminals of the electric motor are electrically connected to the minus and plus terminals, respectively, of the battery, a switch assembly including first and second motor side contact elements electrically connected to the first and second terminals, respectively, of the electric motor, and first and second battery side contact elements electrically connected to the plus and minus terminals, respectively, of the battery, a resistance element electrically connected at its one end and the other end to the plus and minus terminals, respectively, of the battery, and a slide contact element held in contact with the resistance element and slidably movable between one end and the other end of the resistance element, the first and second motor side contact elements and the slide contact element being supported by one of the steering shaft and the rotation shaft, and the first and second battery side contact elements and the resistance element being supported by the other of the steering shaft and the rotation shaft, a torque detecting circuit electrically connected to the slide contact element of the switch assembly for detecting the magnitude of the steering torque by measuring the ratio of the voltage of the resistance element between one end of the resistance element and the slide contact element to the voltage of the resistance element between the other end of the resistance element and the slide contact element, and a motor current control circuit electrically connected to the torque detecting circuit for controlling the electric current supplied to the electric motor on the basis of the magnitude of the steering torque detected by the torque detecting circuit in such a manner that the electric current supplied to the electric motor is increased in response to the increase of the detected magnitude of the steering torque, wherein the steering shaft is rotatable with respect to the rotation shaft to assume three differential rotational positions consisting of a first rotational position in which the steering shaft is rotated in the first and second rotational directions with respect to the rotation shaft within the range of a second predetermined angle smaller than the first predetermined angle, a second rotational position in which the steering shaft is rotated in the first rotational direction with respect to the rotation shaft at a rotational angle beyond the range of the second predetermined angle, and a third rotational position in which the steering shaft is rotated in the second rotational direction with respect to the rotation shaft at a rotational angle beyond the range of the second predetermined angle, the first and second motor side contact elements being held in spaced and non-contact relationship to the first and second battery side contact elements when the steering shaft assumes the first rotational position, so that the electric motor is halted, the first and second motor side contact elements being respectively brought in contact with the first and second battery side contact elements when the steering shaft is rotated to assume the second rotational position, so that the electric motor is driven to rotate the rotation shaft in the first rotational direction, the first and second motor side contact elements being respectively brought in contact with the second and first battery side contact elements when the steering shaft is rotated to assume the third rotational position, so that the electric motor is driven to rotate the rotation shaft in the second rotational direction, the slide contact element being held in contact with the middle portion of the resistance element when the steering shaft assumes the first rotational position, and the slide contact element being moved toward either one end or the other end of the resistance element when the steering shaft is rotated in the first and second rotational directions with respect to the rotation shaft, so that the ratio of the voltage of the resistance element between one end of the resistance element and the slide contact element to the voltage of the resistance element between the other end of the resistance element and the slide contact element is varied in response to the increase of the rotation of the steering shaft in first and second rotational directions with respect to the rotation shaft.

BRIEF DESCRIPTION OF THE DRAWINGS

The features and advantages of an electrically power-assisted steering apparatus in accordance with the present invention will be more clearly understood from the following description taken in conjunction with the accompanying drawings in which.

DESCRIPTION OF THE PREFERRED EMBODIMENTS

Figure 1:
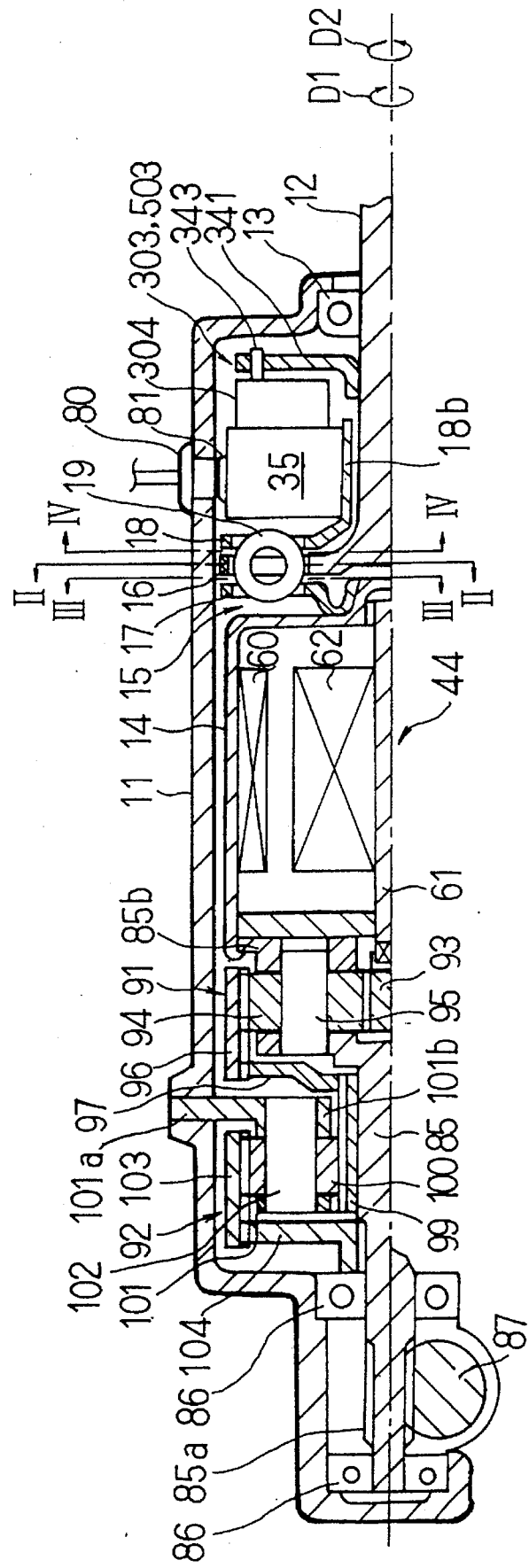
FIG. 1 is a cross-sectional view of first and second embodiments of the electrically power-assisted steering wheel apparatus according to the present invention.

Referring to FIG. 1 of the drawings, a first embodiment of an electrically power-assisted steering apparatus according to the present invention is shown as comprising a stationary gear casing 11 fixedly connected to a vehicle body (not shown), and a steering shaft 12 having a longitudinal portion received in the stationary gear casing 11 and is securely connected at its upper end portion to a steering wheel (not shown), the steering shaft 12 being rotatable about its own center axis with respect to the stationary gear casing 11 through a ball bearing 13 in two different directions consisting of first and second rotational directions D1 and D2 opposite to each other under the influence of steering torque applied to the steering wheel.

The electrically power-assisted steering apparatus further comprises a rotatable motor casing 14 rotatably accommodated in the stationary gear casing 11, and resilient torque transmitting means 15 which is housed in the stationary gear casing 11 for resiliently transmitting the steering torque through the rotatable motor casing 14 from the steering shaft 12 to a rotation shaft (hereinater referred to as "pinion shaft") 85 in a manner to permit the steering shaft 12 to be rotated relatively with respect to the pinion shaft 85 in the first and second rotational directions D1 and D2 within the range of a first predetermined angle.

Figure 2:
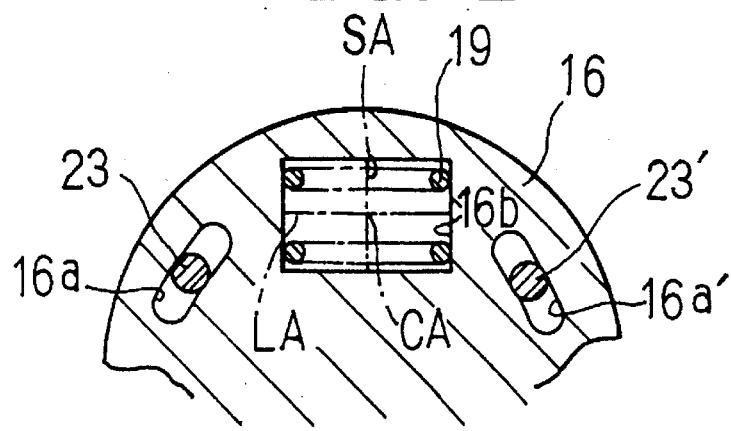
FIG. 2 is an enlarged fragmentary cross-sectional view taken along the line II—II of FIG. 1.

The construction of the resilient torque transmitting means 15 will be described in detail hereinafter with reference to FIGS. 1 to 4. The resilient torque transmitting means 15 comprises an input flange 16, first and second output flanges 17 and 18, guide pins 23 and 23', and a helical compression spring 19 which are all housed in the stationary gear casing 11. As shown in FIGS. 1 and 2, the input flange 16 is integrally formed on the longitudinal portion of the steering shaft 12 to radially extend from the steering shaft 12 and has a peripheral portion formed therein a pair of arcuate guide slots 16a and 16a' circumferentially extending and spaced apart from each other, and an oblong spring slot 16b arranged between and circumferentially equally spaced apart from the arcuate guide slots 16a and 16a' and having a center axis CA extending in parallel relationship to the center axis of the steering shaft 12. The oblong spring slot 16b has a first short axis SA directed toward the center axis of the steering shaft 12 and passing through the center axis CA of the oblong spring slot 16b, and a second long axis LA perpendicular to and larger in length than the short axis SA.

Figure 3:
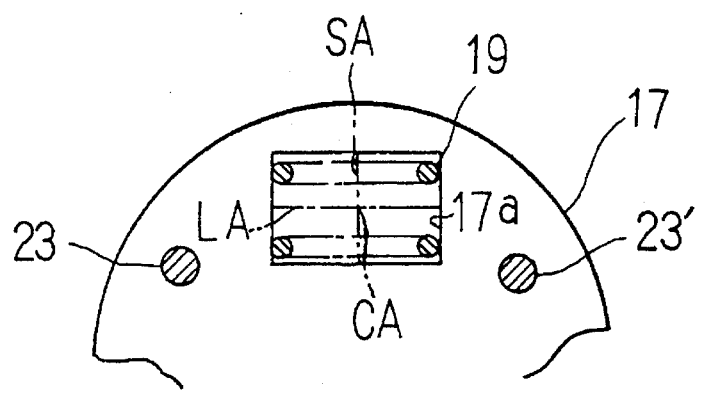
FIG. 3 is an enlarged fragmentary cross-sectional view taken along the line III—III of FIG. 1.

The first output flange 17 is shown in FIGS. 1 and 3 as being disposed between the rotatable motor casing 14 and the input flange 16 and securely connected to the rotatable motor casing 14 in facing and spaced relationship to one of the side surfaces of the input flange 16. The first output flange 17 is formed with an oblong spring slot 17a having a center axis CA extending in parallel relationship to the center axis of the steering shaft 12, a first short axis SA directed toward the center axis of the steering shaft 12 and passing through the center axis CA of the oblong spring slot 17a, the short axis SA being somewhat shorter than or equal to the length of the short axis SA of the oblong spring slot 16b of the input flange 16, and a second long axis LA perpendicular to and larger in length than the short axis SA and equal in length to the long axis LA of the oblong spring slot 16b of the input flange 16. The oblong spring slot 17a of the first output flange 17 is held in registry with the oblong spring slot 16b of the input flange 16 along the center axes CA of the oblong spring slots 16b and 17a while the steering shaft 12 and the rotatable motor casing 14 are rotated at respective rotational angles substantially equal to each other with respect to the stationary gear casing 11.

Figure 4:
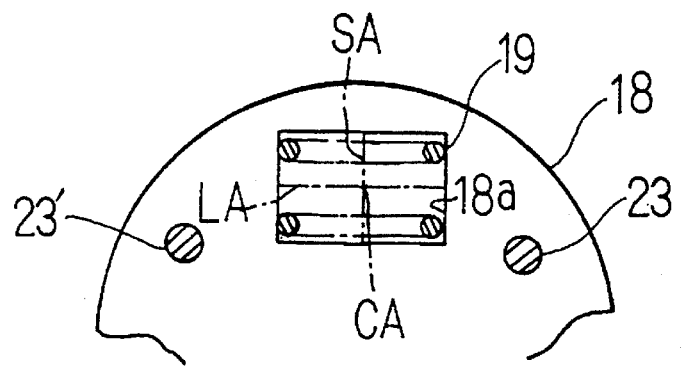
FIG. 4 is an enlarged fragmentary cross-sectional view taken along the line IV—IV of FIG. 1.

The second output flange 18 is shown in FIGS. 1 and 4 as being disposed in opposing relationship to the first output flange 17 through the input flange 16 and in facing and spaced relationship to the other of the side surfaces of the input flange 16. The second output flange 18 is formed with an oblong spring slot 18a having a center axis CA extending in parallel relationship to the center axis of the steering shaft 12, a first short axis SA directed toward the center axis of the steering shaft 12 and passing through the center axis CA of the oblong spring slot 18a, the short axis SA being somewhat shorter than or equal to the length of the short axis SA of the oblong spring slot 16b of the input flange 16, and a second long axis LA perpendicular to and larger in length than the short axis SA and equal in length to the long axis LA of the oblong spring slot 16b of the input flange 16. The oblong spring slot 18a of the second output flange 18 is held in registry with the oblong spring slot 16b of the input flange 16 along the center axes CA of the oblong spring slots 16b and 18a while the steering shaft 12 and the rotatable motor casing 14 are rotated at respective rotational angles substantially equal to each other with respect to the stationary gear casing 11. The second output flange 18 has a protruded ledge portion 18b axially projected away from the input flange 16 along with and circumferentially spaced apart from the steering shaft 12.

The guide pins 23 and 23' are slidably received in the arcuate guide slots 16a and 16a', respectively, and having longitudinal end portions securely connected to the first and second output flanges 17 and 18, respectively, to force the second output flange 18 to be rotated in unison with the first output flange 17 when the first output flange 17 is rotated by the rotatable motor casing 14 with respect to the stationary gear casing 11.

As will be understood from the aforementioned explanation of the resilient torque transmitting means 15, the first and second output flanges 17 and 18 are concurrently rotated by means of the guide pins 23 and 23', and the input flange 16 is relatively rotated with respect to the first and second output flanges 17 and 18 by the steering shaft 12 within the range of the circumferential length of the arcuate guide slots 16a and 16a'. In other words, the rotational angles of the first and second output flanges 17 and 18 with respect to the input flange 16 are regulated by the arcuate guide slots 16a and 16a' of the input flange 16 within the range of the circumferential length of the arcuate guide slots 16a and 16a'.

The helical compression spring 19 is shown in FIGS. 1 to 4 as being received in the oblong spring slot 16b of the input flange 16 and the oblong spring slots 17a and 18a of the first and second output flanges 17 and 18 with its center axis being in axial alignment with the long axis LA of the input flange 16 and with its opposite ends being in pressing engagement with the opposing inner faces of the oblong spring slot 16b of the input flange 16 and the opposing inner faces of the oblong spring slots 17a and 18a of the first and second flanges 17 and 18.

The helical compression spring 19 has a predetermined resiliency and a diameter large enough to be held at its opposite ends in pressing engagement with the opposing inner faces of the oblong spring slot 16b of the input flange 16 and the opposing inner faces of the oblong spring slots 17a and 18a of the first and second flanges 17 and 18 so that when the steering shaft 12 is rotated by the manual steering efforts of the vehicle driver, the input flange 16 is forced to be rotated with respect to the first and second output flanges 17 and 18 against the helical compression spring 19 with the center axis CA of the oblong spring slot 16b being dislocated from the center axes CA of oblong spring slots 17a and 18a of the first and second output flanges 17 and 18. The helical compression spring 19 is thus compressed by the influence of the input flange 16 and the first and second output flanges 17 and 18 so that the steering torque applied to the steering shaft 12 through the steering wheel by the vehicle driver is transmitted or inputted from the input flange 16 to the first and second output flanges 17 and 18 through the helical compression spring 19 and thus to the rotatable motor casing 14. It is thus to be understood that the steering torque applied to the steering shaft 12 through the steering wheel by the vehicle driver is resiliently transmitted to the rotatable motor casing 14 by the resilient torque transmitting means 15.

While there has been described in the above and shown in the drawings as to the fact that the input flange 16 is formed on its peripheral portion with a pair of arcuate guide slots 16a and 16a' circumferentially extending and spaced apart from each other, an additional pair of arcuate guide slots are actually formed in the input flange 16 in symmetrical relationship to the arcuate guide slots 16a and 16a' with respect to the steering shaft 12. In a similar manner, additional oblong spring slots are in reality formed respectively in the input flange 16, the first output flange 17 and the second output flange 18 in symmetrical relationship to the oblong spring slot 16b of the input flange 16, the oblong spring slot 17a of the first output flange 17, and the oblong spring slot 18a of the second output flange 18 with respect to the steering shaft 12. An additional helical compression spring is of course received in the additional oblong spring slot of the input flange 16, the additional oblong spring slot of the first output flange 17, and the additional oblong spring slot of the second output flange 18 in a similar fashion to the above description. According to the present invention, the number of the helical compression springs and the number of the oblong spring slots formed in the flanges to receive the compression springs are varied based on the modification of the first torque transmitting means 15.

Figure 5:
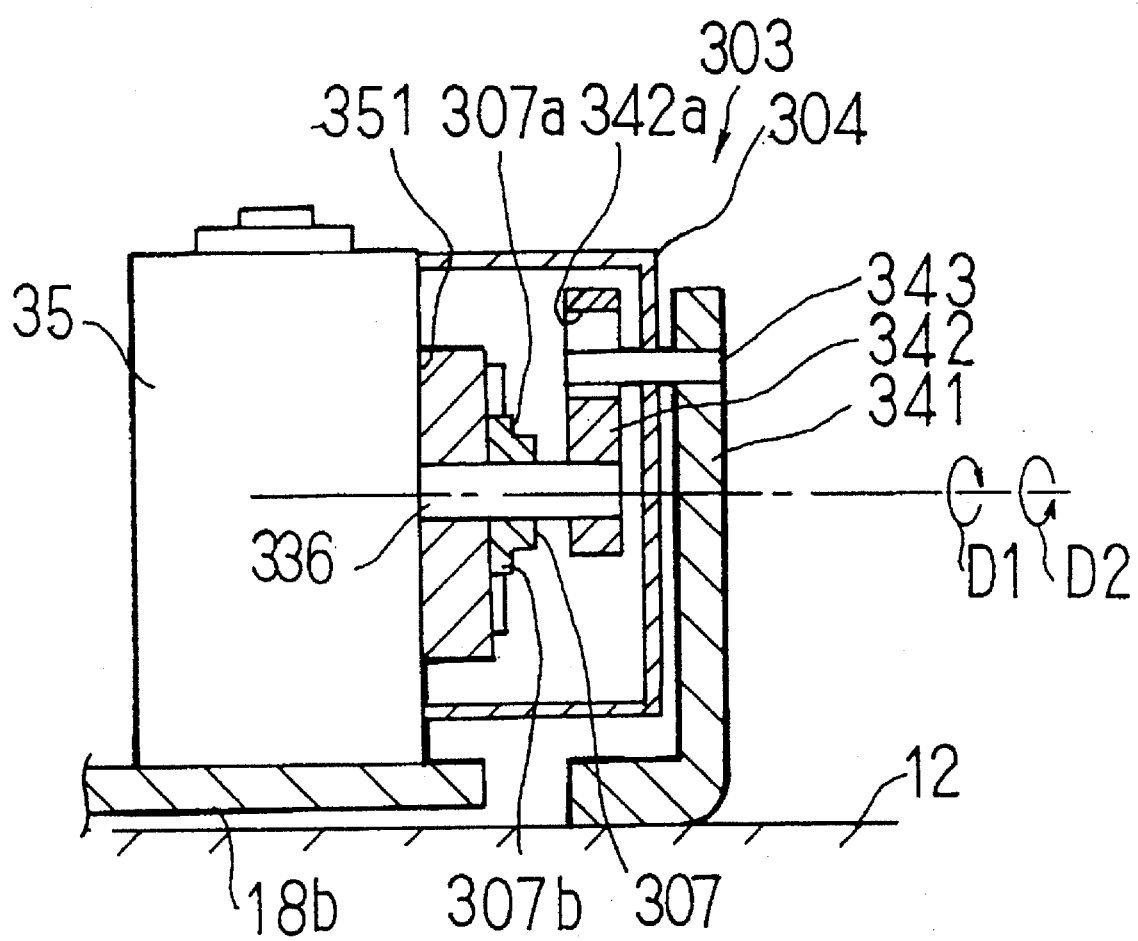
FIG. 5 is an enlarged perspective view of the controller and the switch assembly forming part of the electrically power-assisted steering wheel apparatus according to the present invention.
Figure 6:
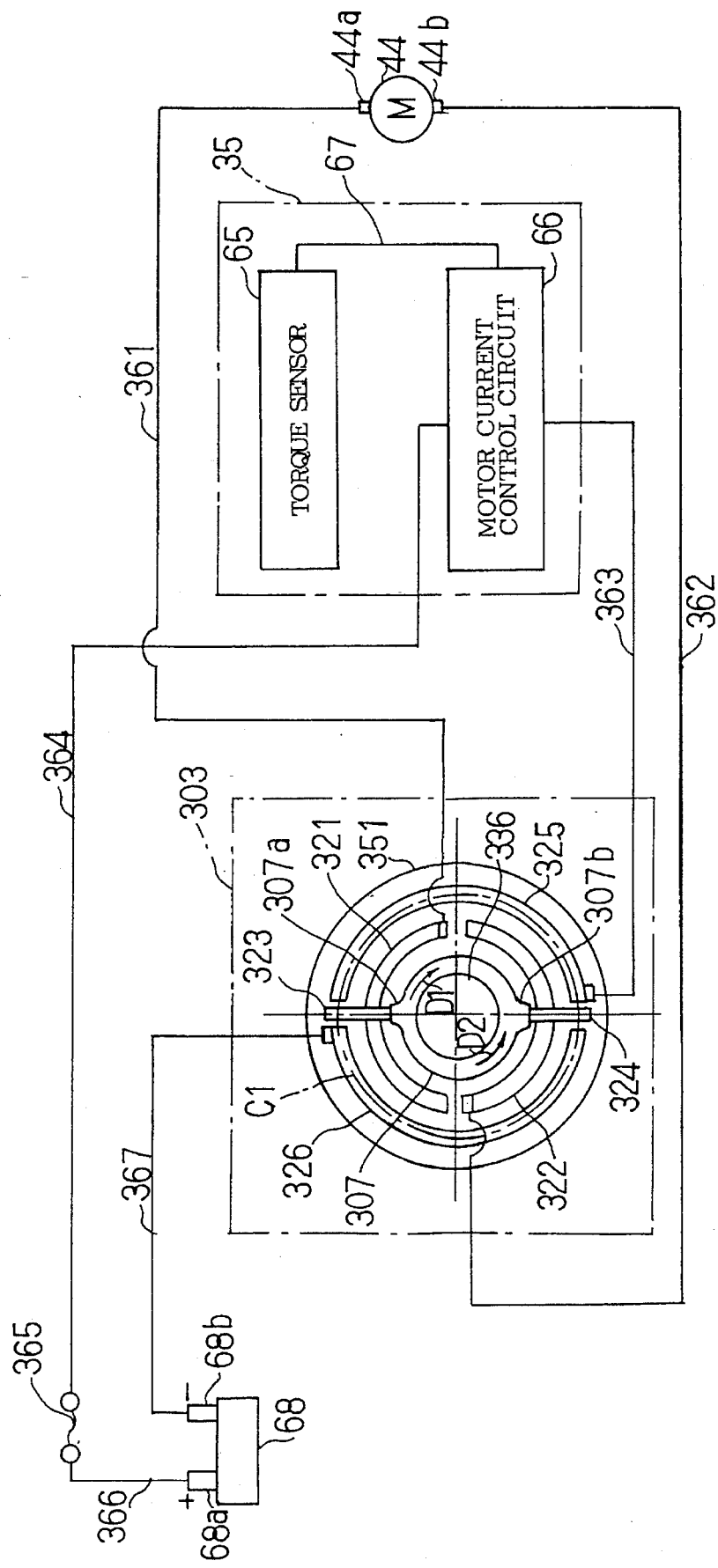
FIG. 6 is an electric circuit diagram showing the controller, the switch assembly, the battery and the electric motor of the first embodiment at a time when the steering shaft assumes the first rotational position.

The electrically power-assisted steering apparatus is shown in FIG. 1 as further comprising an electric motor 44 constituted by a stator 60 securely mounted on the inner surface of the rotatable motor casing 14, an output shaft 61 rotatably supported on the rotatable motor casing 14 with its center axis being in axial alignment with the center axis of the steering shaft 12, and a rotor 62 securely mounted on the rotational output shaft 61. In addition, the electric motor 44 is shown in FIG. 6 as having first and second terminals 44a and 44b electrically connected selectively to plus and minus terminals 68a and 68b, respectively, of a battery 68 and to the minus and plus terminals 68b and 68a, respectively, of the battery 68 as will be understood from the explanation described hereinafter. The electric motor 44 is operatively connected to the pinion shaft 85 through first and second planetary gear assemblies 91 and 92 described hereinlater for assisting the steering torque applied to the steering shaft 12 through the steering wheel by the vehicle driver. The pinion shaft 85 is rotated by the electric motor 44 through the first and second planetary gear assemblies 91 and 92 in the first rotational direction D1 when the first and second terminals 44a and 44b of the electric motor 44 are electrically connected to the plus and minus terminals 68a and 68b, respectively, of the battery 68. The pinion shaft 85 is rotated by the electric motor 44 through the first and second planetary gear assemblies 91 and 92 in the second rotational direction D2 when the first and second terminals 44a and 44b of the electric motor 44 are electrically connected to the minus and plus terminals 68b and 68a, respectively, of the battery 68. In FIGS. 1, 5 and 6, the electrically power-assisted steering apparatus further comprises a switch assembly 303 which includes a switch casing 304 securely mounted on the ledge portion 18b of the second output flange 18 by way of a control unit 35 having functions which will become apparent as the description proceeds.

As will be best seen from FIG. 5, the switch assembly 303 further includes a base plate member 351 fixed to the protruded ledge portion 18b of the output flange 18 through the control unit 35, a center shaft 336 rotatably supported by the base plate member 351 and having a center axis radially spaced apart from and parallel to the center axis of the steering shaft 12, and a spider ring 307 securely coupled with the center shaft 336 and having two protuberances 307a and 307b radially extending and equally spaced apart from each other in the circumferential direction of the spider ring 37.

The switch assembly 303 further includes a radial arm 341 housed in the stationary gear casing 11 and radially extending from and securely connected to the steering shaft 12 in axially spaced and opposing relationship to the second output flange 18 of the resilient torque transmitting means 15. The radial arm 341 is rotated together with the steering shaft 12 around the center axis of the steering shaft 12 when the steering torque is applied to the steering shaft 12 through the steering wheel by the vehicle driver. Reference numeral 342 denotes a swingable connecting rod forming part of the switch assembly 303 and formed at its first longitudinal half portion with a guide slot 342a. The guide slot 342a has therein slidably received a slide guide pin 343 which is rigidly supported by the radially outer portion of the radial arm 341. The swingable connecting rod 342 is securely connected at its second longitudinal half portion to the center shaft 336.

The swing able connecting rod 342 is thus swung around the center axis of the center shaft 336 by the radial arm 341 through the slide guide pin 343 when the steering shaft 12 is rotated through the steering wheel by the manual steering efforts of the vehicle driver on the assumption that the radial arm 341 is moved relatively with respect to the protruded ledge portion 18b of the second output flange 18. The swing motion of the swingable connecting rod 342 causes the center shaft 336 of the switch assembly 303 to be rotated with respect to the base plate member 351 in two different directions consisting of first and second rotational directions D1 and D2 opposite to each other in the same manner as the steering shaft 12 as shown in FIGS. 5 and 6. The relative motion between the radial arm 341 fixed on the steering shaft 12 and the second output flange 18 securely connected to the rotatable motor casing 14 results from the compression of the helical compression spring 19 caused by the rotational motion of the input flange 16 with respect to the first and second output flanges 17 and 18.

The switch assembly 303 is shown in FIG. 6 as further comprising first and second slide elements 321 and 322, first and second motor side contact elements 323 and 324, and first and second battery side contact elements 325 and 326. The first and second slide elements 321 and 322 fixedly supported by the base plate member 351 and arcuately extending around the center axis of the center shaft 336 in spaced-apart relationship to each other and in symmetric relationship with respect to the center axis of the center shaft 336. The first slide element 321 is electrically connected to the first terminal 44a of the electric motor 44 by a line 361, while the second slide element 322 is electrically connected to the second terminal 44b of the electric motor 44 by a line 362. The first motor side contact element 323 is securely supported by the protuberance 307a of the spider ring 307 to extend in the outwardly radial direction of the center shaft 336 from the protuberance 307a of the spider ring 307. Similarly to the first motor side contact element 323, the second motor side contact element 324 is securely supported by the protuberance 307b of the spider ring 307 to 16 extend in the outwardly radial direction of the center shaft 336 from the protuberance 307b of the spider ring 307. In addition, the first and second motor side contact elements 323 and 324 are positioned on a circumferential line C1 around the center axis of the center shaft 336. The first motor side contact element 323 thus supported by the protuberance 307a of the spider ring 307 is slidably held in contact with the first slide element 321 and accordingly electrically connected to the first terminal 44a of the electric motor 44 through the first slide element 321 and the line 361, while the second motor side contact element 324 is slid ably held in contact with the second slide element 322 and accordingly electrically connected to the second terminal 44b of the electric motor 44 through the second slide element 322 and the line 362. The first battery side contact elements 325 and 326 are fixedly supported by the base plate member 351 and positioned radially outwardly of and radially spaced apart from the first and second slide elements 321 and 322 to arcuately extend on the circumferential line C1 around the center axis of the center shaft 336. Similarly to the first and second slide elements 321 and 322, the first and second battery side contact elements 325 and 326 is in spaced-apart relationship to each other and in symmetric relationship with respect to the center axis of the center shaft 336. The first battery side contact element 325 is electrically connected to the plus terminal 68a of the battery 68 by a line 363, a motor current control circuit 66 which will be explained in detail hereinlater, a line 364, a fuse 365 and a line 366, while the second battery side contact element 326 is electrically connected to the minus terminal 68b of the battery 68 by a line 367. The fuse 365 electrically connecting the lines 364 and 366 is broken by an abnormally high electric current passed therein as in a usual manner.

Figure 7:
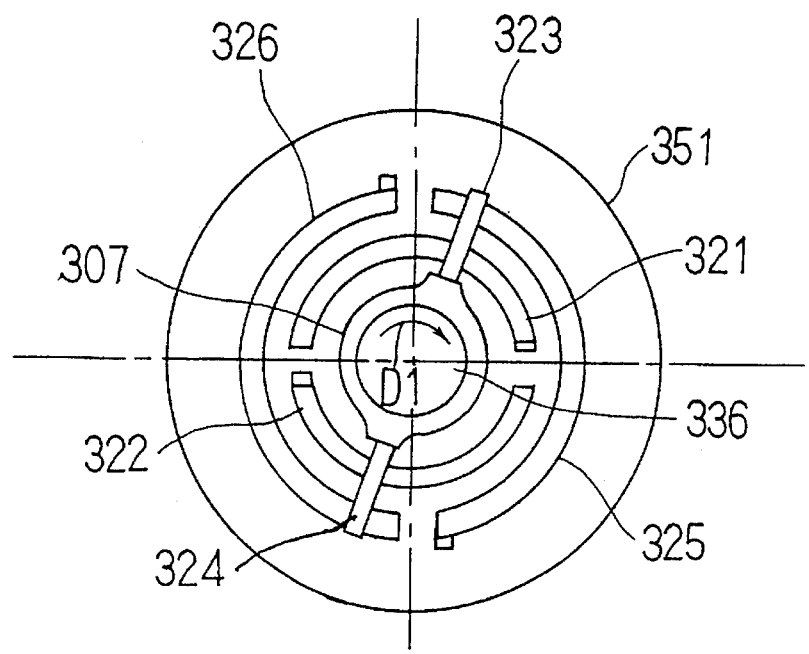
FIG. 7 is a plan view of the switch assembly illustrated in FIG. 6 for showing the relative positions of first and second motor side contact elements with respect to the battery side contact elements at a time when the steering shaft is rotated to assume the second rotational position.
Figure 8:
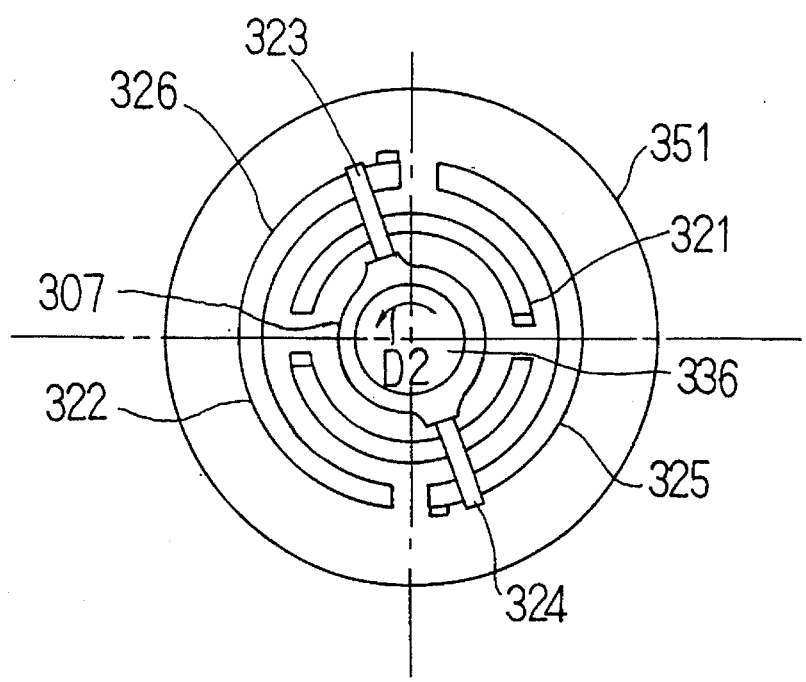
FIG. 8 is a plan view of the switch assembly illustrated in FIG. 6 for showing the relative positions of first and second motor side contact elements with respect to the battery side contact elements at a time when the steering shaft is rotated to assume the third rotational position.

The steering shaft 12 is rotatable with respect to the pinion shaft 85 to assume three differential rotational positions consisting of first, second and third rotational positions in accordance with the magnitude and the direction of the steering torque applied to the steering shaft 12 through the steering wheel by the vehicle driver. When the steering shaft 12 assumes the first rotational position, the steering shaft 12 is rotated in the first and second rotational directions D1 and D2 with respect to the pinion shaft 85 within the range of a second predetermined angle smaller than the first predetermined angle described in the explanation of the resilient torque transmitting means 15. At this time, the first and second motor side contact elements 323 and 324 are held in spaced and non-contact relationship to the first and second battery side contact elements 325 and 326 as shown in FIG. 6, thereby turning off the electric current supplied to the electric motor 44 to prevent the pinion shaft 85 from being rotated by the electric motor 44. When the steering shaft 12 is rotated to assume the second rotational position, the steering shaft is rotated in the first rotational direction D1 with respect to the pinion shaft 85 at a rotational angle beyond the range of the second predetermined angle. At this time, the first motor side contact element 323 is brought in contact with the first battery side contact element 325, while the second motor side contact element 324 is brought in contact with the second battery side contact element 326 as shown in FIG. 7. This means that the first terminal 44a of the electric motor 44 is electrically connected to the plus terminal 68a of the battery 68 and the second terminal 44b of the electric motor 44 is electrically connected to the minus terminal 68b of the battery 68. As a consequence, the pinion shaft 85 is rotated in the first rotational direction D1 by the electric motor 44 to assist the steering torque applied to the steering shaft 12 through the steering wheel by the vehicle driver. When, on the contrary, the steering shaft 12 is rotated to assume the third rotational position, the steering shaft 12 is rotated in the second rotational direction D2 with respect to the pinion shaft 85 at a rotational angle beyond the range of the second predetermined angle. At this time, the first motor side contact element 323 is brought in contact with the second battery side contact element 326, while the second motor side contact element 324 is brought in contact with the first battery side contact element 325 as shown in FIG. 8. This results in the fact that the first terminal 44a of the electric motor 44 is electrically connected to the minus terminal 68b of the battery 68 and the second terminal 44b of the electric motor 44 is electrically connected to the plus terminal 68a of the battery 68. The pinion shaft 85 is, therefore, rotated in the second rotational direction D2 by the electric motor 44 to assist the steering torque applied to the steering shaft 12 through the steering wheel by the vehicle driver.

The control unit 35 is shown in FIGS. 1 and 8 as including a torque sensor 65 for detecting the magnitude of the steering torque applied to the steering shaft 12 through the steering wheel by the vehicle driver. For example, the torque sensor 85 is designed to detect the magnitude of the steering torque by measuring the variation of the relative rotation between the steering shaft 12 and the pinion gear 85 caused by resilient torque transmitting means 15. The control unit 35 further includes a motor current control circuit 66 electrically connected to the torque sensor 65 to control the electric current supplied to the electric motor 44 on the basis of electric signals fed from the torque sensor 65 in such a manner that the electric current supplied to the electric motor 44 is increased in response to the increase of the magnitude of the steering torque detected by the torque sensor 65.

The control unit 35 and the switch assembly 303 are supplied with an electric power by the battery 68 through slidable contacts 80 and 81 one of which is secured to the stationary gear casing 11 and the other of which is secured to the control unit 35. The electric power from the motor current control circuit 66 is fed to the rotor 62 of the electric motor 44 by means of a wire harness not shown.

Turning back to FIG. 1, the pinion shaft 85 is rotatably supported on the stationary gear casing 11 through ball bearings 86 with its center axis being in axial alignment with the center axis of the steering shaft 12 and having a pinion portion 85a at its longitudinal forward end portion and a base portion 85b at its longitudinally rear end portion and securely connected to the motor casing 14. Reference numeral 87 denotes the rack member extending laterally of the vehicle body and rotatably supported on the vehicle chassis, the rack member 87 being in mesh with the pinion portion 85a of the pinion shaft 85 to transmit the steering torque from the pinion shaft 85 to the front wheels of the vehicle through tie rods not shown.

The first and second planetary gear assemblies 91 and 92 are designed to reduce the revolutions of the electric motor 44 and transmitting the rotational torque of the electric motor 44 to the pinion shaft 85. More specifically, the first planetary gear assembly 91 comprises an externally toothed sun gear 93 securely coupled with the output shaft 61 of the electric motor 44 in axial alignment with the rotation shaft 61, a plurality of pinion gears 94 held in mesh with the externally toothed sun gear 93 and each rotatably supported on the base portion 85b of the pinion shaft 85 through a rotation shaft 95 having axially end portions secured to the base portion 85b of the pinion shaft 85, an internally toothed ring gear 96 held in mesh with the pinion gears 94, and a connecting member 97 having an axially rear end portion secured to the internally toothed ring gear 96.

The second planetary gear assembly 92, on the other hand, comprises an externally toothed sun gear 99 securely connected through the connecting member 97 to the internally toothed ring gear 96 of the first planetary gear assembly 91 to be rotated together with the internally toothed ring gear 96 of the first planetary gear assembly 91, a plurality of pinion gears 100 held in mesh with the externally toothed sun gear 99 and each rotatably supported on the stationary gear housing 11 through a planet carrier 101 having a radially outer portion 101a securely connected to the stationary gear housing 11 and a radially inner portion 101b secured to a rotation shaft 102 rotatably supporting the pinion gears 100, an internally toothed ring gear 103 held in mesh with the pinion gears 100, and a connecting member 104 having an axially rear end portion secured to the internally toothed ring gear 103 of the second planetary gear assembly 92 and an axially front end portion secured to the longitudinally intermediate portion of the pinion shaft 85.

The rotational torque of the electric motor 44 is transmitted to the pinion shaft 85 through the externally toothed sun gear 93, the pinion gears 94, the internally toothed ring gear 96 and the connecting member 97 of the first planetary gear assembly 91 and the externally toothed sun gear 99, the pinion gears 100, the internally toothed ring gear 103 and the connecting member 104 of the second planetary gear assembly 92 at reduced revolutions. The explanation concerning the transmissions of the steering torque and the motor torque is described in detail in Japanese Patent Application No. 3-314377 filed by the present applicant.

According to the above mentioned structure of the motion transforming mechanism, the helical compression spring 19 of the resilient torque transmitting means 15 is contracted by the input flange 16 fixed to the steering shaft 12 and the second output flange 18 fixed to the motor casing 14 under the condition that the steering shaft 12 is rotated through the steering wheel by the vehicle driver with respect to the pinion shaft 85 within the range of the second predetermined angle. At this time, the steering shaft 12 assumes the first rotational position and as a result the first and second motor side contact elements 323 and 324 are held in spaced and non-contact relationship to the first and second battery side contact elements 325 and 326, thereby turning off the electric current supplied to the electric motor 44 to stop the steering torque of the steering shaft 12 from be assisted by the electric motor 44.

The helical compression spring 19 of the resilient torque transmitting means 15 is contracted by the input flange 16 fixed to the steering shaft 12 and the second output flange 18 fixed to the motor casing 14 under the condition that the steering shaft 12 is rotated through the steering wheel in the first rotational direction D1 by the vehicle driver with respect to the pinion shaft 85 at the rotational angle beyond the range of the second predetermined angle. In this instance, the steering shaft 12 is shifted to assume the second rotational position, so that the first motor side contact element 323 is brought in contact with the first battery side contact element 325 and the second motor side contact element 324 is brought in contact with the second battery side contact element 326. The first terminal 44a of the electric motor 44 is, accordingly, electrically connected to the plus terminal 68a of the battery 68, while the second terminal 44b of the electric motor 44 is electrically connected to the minus terminal 68b of the battery 68, thereby causing the output shaft 61 of the electric motor 44 to be rotated in the first rotational direction D1. At this time, the electric current supplied from the battery 68 to the electric motor 44 is controlled by the motor current control circuit 66 in such a manner as to be increased in response to the increase of the steering torque of the steering shaft 12 detected by the torque sensor 65, so that the steering torque applied to the steering shaft 12 through the steering wheel by the vehicle driver can be assisted by the adequate torque of the electric motor 44.

The helical compression spring 19 of the resilient torque transmitting means 15 is contracted by the input flange 16 fixed to the steering shaft 12 and the second output flange 18 fixed to the motor casing 14 under the condition that the steering shaft 12 is rotated through the steering wheel in the second rotational direction D2 by the vehicle driver with respect to the pinion shaft 85 at the rotational angle beyond the range of the second predetermined angle. In this case, the steering shaft 12 is shifted to assume the third rotational position, so that the first motor side contact element 323 is brought in contact with the second battery side contact element 326 and the second motor side contact element 324 is brought in contact with the first battery side contact element 325. This results in the fact that the first terminal 44a of the electric motor 44 is electrically connected to the minus terminal 68b of the battery 68 and the second terminal 44b of the electric motor 44 is electrically connected to the minus terminal 68b of the battery 68, thereby causing the output shaft 61 of the electric motor 44 to be rotated in the second rotational direction D2. At this time, the electric current supplied from the battery 68 to the electric motor 44 is controlled by the motor current control circuit 66 in such a manner as to be increased in response to the increase of the steering torque of the steering shaft 12 detected by the torque sensor 65 and as a consequence the steering torque applied to the steering shaft 12 through the steering wheel by the vehicle driver can be assisted by the adequate torque of the electric motor 44.

As will be understood from the aforesaid description, the electric current can be unmistakably prevented from being supplied from the battery 68 to the electric motor 44 when the steering shaft 12 is shifted to assume the first rotational position, namely, when the electric motor 44 is not required to assist the steering torque applied to the steering shaft 12 through the steering wheel by the vehicle driver. Therefore, the electric motor 44 can be certainly prevented from being erroneously driven if the torque sensor 65 and the motor current control circuit 66 concurrently forming the control unit 35 are damaged or operated in a wrong manner.

Additionally, the electrically power-assisted steering apparatus according to the present invention is not required to be adapted to comprise the prior-art detecting means for detecting the damage or wrong operation of the control unit, so that the electrically power-assisted steering apparatus can be simple in overall construction and inexpensive as compared with the prior-art steering apparatus.

Figure 9:
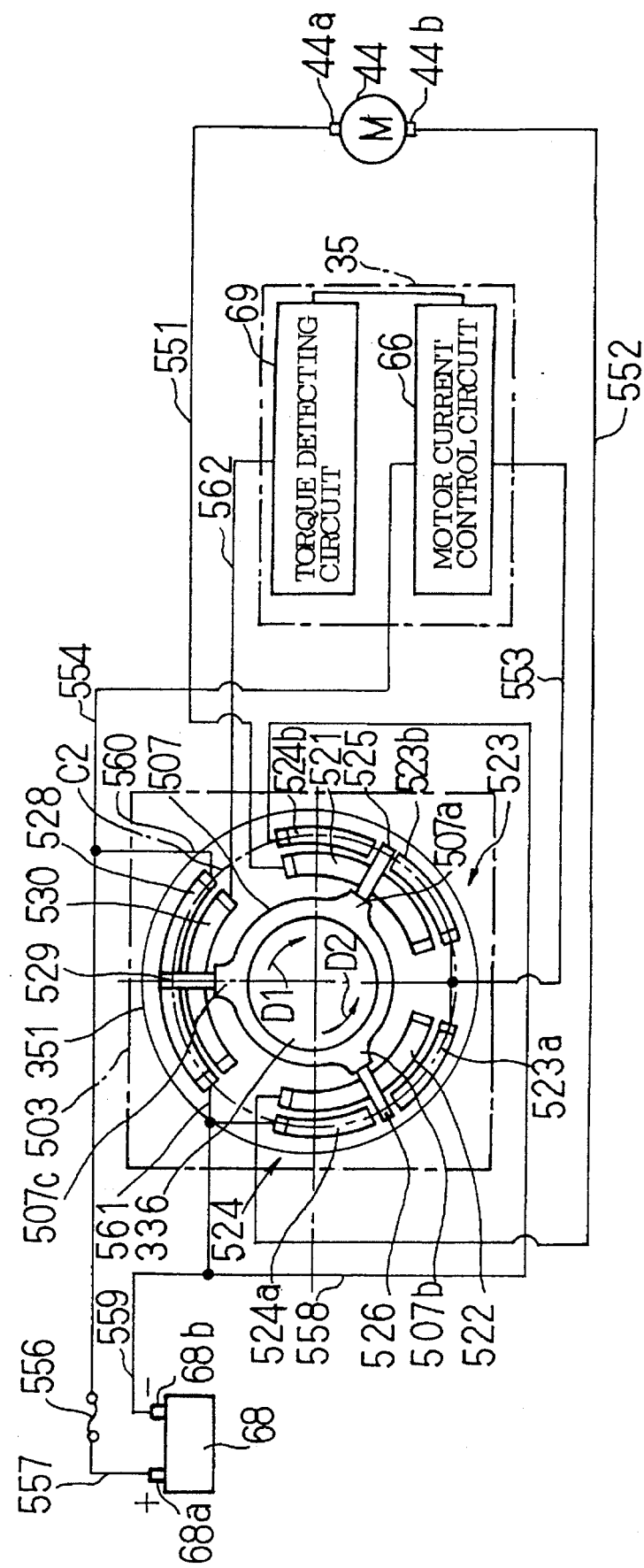
FIG. 9 is an electric circuit diagram showing the controller, the switch assembly, the battery and the electric motor of the second embodiment at a time when the steering shaft assumes the first rotational position.
Figure 10:
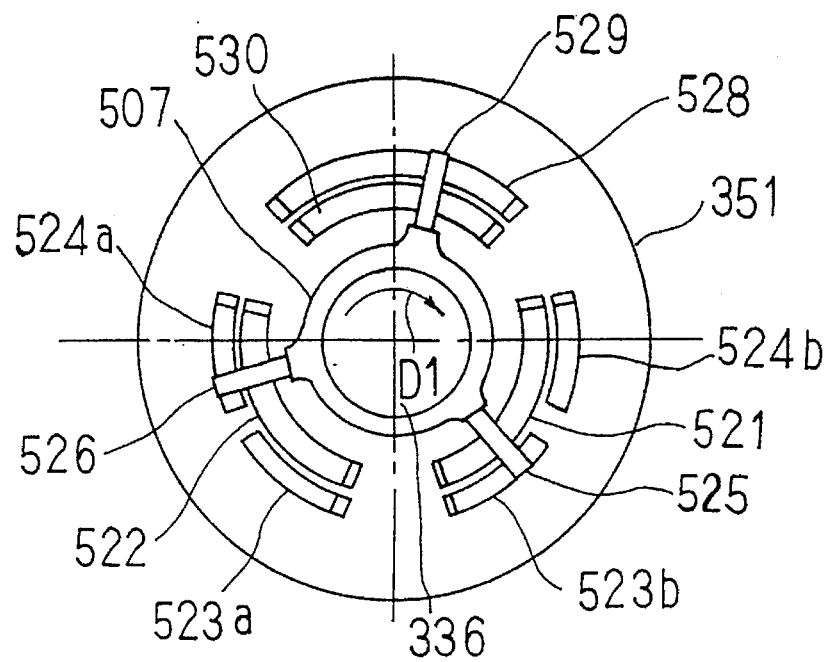
FIG. 10 is a plan view of the switch assembly illustrated in FIG. 9 for showing the relative positions of first and second motor side contact elements with respect to the battery side contact elements at a time when the steering shaft is rotated to assume the second rotational position.
Figure 11:
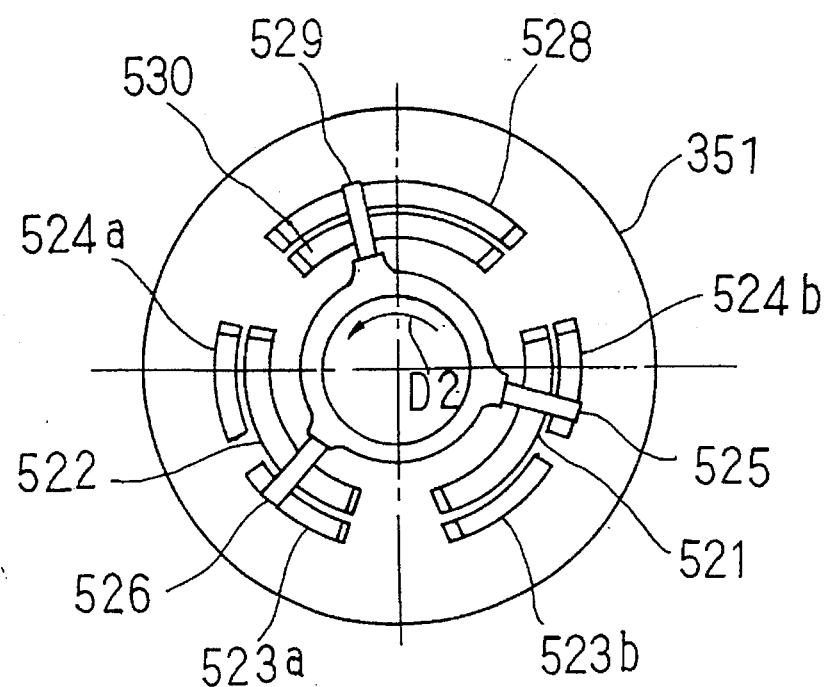
FIG. 11 is a plan view of the switch assembly illustrated in FIG. 9 for showing the relative positions of first and second motor side contact elements with respect to the battery side contact elements at a time when the steering shaft is rotated to assume the third rotational position.

FIGS. 9 to 11 show a second embodiment of the electrically power-assisted steering apparatus according to the present invention. The electrically power-assisted steering apparatus in the second embodiment comprises a switch assembly 503 and a torque detecting circuit 69 and is constructed in similar manner to that of the aforesaid first embodiment except for the differences in construction between the switch assembly 303 of the first embodiment and the switch assembly 503 and between the torque sensor 65 of the first embodiment and the torque detecting circuit 69. For this reason, the following description will be merely and briefly made regarding the switch assembly 503 and the torque detecting circuit 69 with reference FIGS. 1 to 5.

As shown in FIG. 9, the switch assembly 503 comprises first, second and third slide elements 521, 522 ad 530, a first battery side contact element 523 constituted by a pair of battery side contact terminals 523a and 523b, a second battery side contact element 524 constituted by a pair of battery side contact terminals 524a and 524b, first and second motor side contact elements 525 and 526, a resistance element 528 constituted by an electrical resistance material, and a slide contact element 529.

The first slide element 521 circumferentially extends around the center axis of the center shaft 336. The battery side contact terminal 523b of the first battery side contact element 528 is positioned radially outwardly of and radially spaced apart from the first slide element 521 and circumferentially extending on a circumferential line C2 around the center axis of the center shaft 386, while the battery side contact terminal 524b of the second battery side contact element 524 is positioned radially outwardly of and radially spaced apart from the first slide element 521, and circumferentially extending on the circumferential line C2 around the center axis of the center shaft 336, the battery side contact terminal 524b of the second battery side contact element 524 being circumferentially spaced apart at a predetermined gap from the battery side contact terminal 523b of the first battery side contact element 528. The first motor side contact element 525 has a radially inner end portion secured to a first protuberance 507a of a spider ring 507 and extending radially in slidable contact with the first slide element 521, the battery side contact terminal 523b of the first battery side contact element 523 and the battery side contact terminal 524b of the second battery side contact element 524.

The second slide element 522 circumferentially extends around the center axis of the center shaft 336. The battery side contact terminal 524a of the second battery side contact element 524 is positioned radially outwardly of and radially spaced apart from the second slide element 522 and circumferentially extending on the circumferential line C2 around the center axis of the center shaft 336, while the battery side contact terminal 523a of the first battery side contact element 523 is positioned radially outwardly of and radially spaced apart from the second slide element 522 and circumferentially extending on the circumferential line C2 around the center axis of the center shaft 336, the battery side contact terminal 523a of the first battery side contact element 523 being circumferentially spaced apart at a predetermined gap from the battery side contact terminal 524a of the second battery side contact element 524. The second motor side contact element 526 has a radially inner end portion secured to a second protuberance 507b of the spider ring 507 and extending radially in slidable contact with the second slide element 522, the battery side contact terminal 524a of the second battery side contact element 524 and the battery side contact terminal 523a of the first battery side contact element 523.

The third slide element 530 is circumferentially extended around the center axis of the center shaft 336. The resistance element 528 is positioned radially outwardly of and radially spaced apart from the third slide element 530 and circumferentially extending on the circumferential line C2 around the center axis of the center shaft 336. The slide contact element 529 has a radially inner end portion secured to a third protuberance 507c of the spider ring 507 and extending radially in sliding contact with the third slide element 530 and the resistance element 528.

The first slide element 521 is electrically connected to the first terminal 44a of the electric motor 44 by a line 551, while the second slide element 522 is electrically connected to the second terminal 44b of the electric motor 44 by a line 552. This results in the fact that the first motor side contact element 525 is held in electrically contact with the first terminal 44a of the electric motor 44 and the second motor side contact element 526 is held in electrically contact with the second terminal 44b of the electric motor 44. The battery side contact terminals 523a and 523b of the first battery side contact element 523 is electrically connected to each other and to the plus terminal 68a of the battery through a line 553, the motor current control circuit 66, a line 554, a fuse 556 and a line 557. The battery side contact terminals 524a and 524b of the second battery side contact element 524 are electrically connected to each other through a line 558 and to the minus terminal 68b of the battery 68 through the line 558 and a line 559. The resistance element 528 is electrically connected at its one end to the plus terminal 68a of the battery 68 through a line 560, the lines 554 and 557 and the fuse 556, and at its the other end to the minus terminal 68b of the battery 68 through a line 561 and the lines 558 and 559. The third slide element 530 is electrically connected to the torque detecting circuit 69 by a line 562.

In the switch assembly 503 thus constructed, the variation of the rotation of the spider ring 507 from the position shown in FIG. 9 with respect to the base plate member 351, namely the variation of rotation of the steering shaft 12 from the first rotational position in the first and the second rotational directions D1 and D2 with respect to the pinion shaft 85 results in the variation of the ratio of the voltage of the resistance element 528 between one end of the resistance element 528 and the slide contact element 529 to the voltage of the resistance element 528 between the other end of the resistance element 528 and the slide contact element 529. For example, the voltage of the resistance element 528 between one end of the resistance element 528 and the slide contact element 529 is increased in proportion to the rotation of the spider ring 507 from the rotational position shown in FIG. 9 with respect to the base plate member 351 in the first rotational direction D1.

Similarly to the first embodiment of the electrically power-assisted steering apparatus according to the present invention, the steering shaft 12 can assume the first rotational position in which the steering shaft 12 is rotated in the first and second rotational directions D1 and D2 with respect to the pinion shaft 85 within the range of the second predetermined angle, the second rotational position in which the steering shaft 12 is rotated in the first rotational direction D1 with respect to the pinion shaft 85 at the angle beyond the range of the second predetermined angle, and the third rotational position in which the steering shaft 12 is rotated in the second rotational direction D2 with respect to the pinion shaft 85 at the angle beyond the range of the second predetermined angle. When the steering shaft 12 assumes the first rotational position, the spider ring 507 rotated by the steering shaft 12 assumes a neutral rotational position with respect to base plate member 351 securely connected to the pinion shaft 85 as shown in FIG. 9. At this time, the first and second motor side contact elements 525 and 526 are held in spaced and non-contact relationship to the battery side contact terminals 523a, 523b, 524a and 524b of the first and second battery side contact elements 523 and 524. Therefore, the electric current is supplied from the battery 68 to the electric motor 44, so that electric motor 44 is halted and accordingly does not assist the steering torque applied to the steering shaft 12 through the steering wheel by the vehicle driver. As shown in FIG. 10, the spider ring 507 is rotated in the first rotational direction D1 from the rotational position shown in FIG. 9 with respect to the base plate member 351 if the steering shaft 12 is shifted by operation of the vehicle driver to assume the second rotational position. When the spider ring 507 is thus rotated, the first motor side contact element 525 is brought in contact with the battery side contact terminal 523b of the first battery side contact element 523, while the second side contact element 526 is brought in contact with the battery side contact terminal 524a of the second battery side contact element 524. This means that the electric motor 44 is driven in a manner rotating the output shaft 61 of the electric motor 44 in the first direction D1 with respect to the motor casing 14 to rotate the pinion shaft 85 in the first rotational direction D1 through the first and second planetary gear assemblies 91 and 92, thereby assisting the steering torque applied to the steering shaft 12 through the steering wheel by the vehicle driver. As shown in FIG. 11, the spider ring 507 is rotated in the second rotational direction D2 from the rotational position shown in FIG. 9 with respect to the base plate member 351 if the steering shaft 12 is shifted by the operation of the vehicle driver to assume the third rotational position. When the spider ring 507 is thus rotated, the first motor side contact element 525 is brought in contact with the battery side contact terminal 524b of the second battery side contact element 524, while the second side contact element 526 is brought in contact with the battery side contact terminal 523a of the first battery side contact element 523. This means that the electric motor 44 is driven in a manner rotating the output shaft 61 of the electric motor 44 in the second rotational direction D2 with respect to the motor casing 14 to rotate the pinion shaft 85 in the second rotational direction D2 through the first and second planetary gear assemblies 91 and 92, thereby assisting the steering torque applied to the steering shaft 12 through the steering wheel by the vehicle driver.

The torque detecting circuit 69 electrically connected to the slide contact element 529 of the switch assembly 503 is adapted to detect the magnitude of the steering torque by measuring the ratio of the voltage of the resistance element 528 between one end of the resistance element 528 and the slide contact element 529 to the voltage of the resistance element 528 between the other end of the resistance element 528 and the slide contact element 529. As described in the first embodiment, the motor current control circuit 66 is electrically connected to the torque detecting circuit 69 for controlling the electric current supplied to the electric motor 44 on the basis of the magnitude of said steering torque detected by the torque detecting circuit 69 in such a manner that the electric current supplied to the electric motor 44 is increased in response to the increase of the detected magnitude of the steering torque.

As will have been appreciated from the aforesaid description, the second embodiment of the electrically power-assisted steering apparatus according to the present invention has the advantages described hereinlater. The electric current can be unmistakably prevented from being supplied from the battery 68 to the electric motor when the steering shaft 12 is shifted to assume the first rotational position, namely, when the electric motor 44 is not required to assist the steering torque applied to the steering shaft 12 through the steering wheel by the vehicle driver. Therefore, the electric motor 44 can be certainly prevented from being erroneously driven if the torque sensor 65 and the motor current control circuit 66 is damaged or operated in a wrong manner. In addition, the electrically power-assisted steering apparatus according to the present invention is not required to be adapted to comprise the prior-art detecting means for detecting the damage or wrong operation of the control unit, so that the electrically power-assisted steering apparatus can be simple in overall construction and inexpensive as compared with the prior-art steering apparatus. Furthermore, the electrically power-assisted steering apparatus according to the present invention is not required to be designed to include an expensive torque sensor such as a magnetic torque sensor or a optical torque sensor, thereby rendering more inexpensive the electrically power-assisted steering apparatus.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. An electrically power-assisted steering apparatus comprising:

a steering shaft rotatable with a steering wheel and rotated about its center axis with respect to a vehicle body in opposite first and second rotational directions under the influence of steering torque applied to said steering wheel by a vehicle driver;

a rotation shaft operatively connected to front wheels of a vehicle and rotatable in said first and second rotational directions about its center axis which is in axial alignment with the center axis of said steering shaft;

resilient torque transmitting means including a spring for resiliently transmitting said steering torque from said steering shaft to said rotation shaft in a manner to permit said steering shaft to be rotated relatively with respect to said rotation shaft in said first and second rotational directions within the range of a first predetermined angle;

an electric motor having first and second terminals electrically connected selectively to plus and minus terminals, respectively, of a battery and to said minus and plus terminals, respectively, of said battery, said electric motor being operatively connected to said rotation shaft for assisting said steering torque applied to said steering wheel by said vehicle driver, said rotation shaft being rotated by said electric motor in said first rotational direction when said first and second terminals of said electric motor are electrically connected to said plus and minus terminals, respectively, of said battery, and said rotation shaft being rotated by said electric motor in said second rotational direction when said first and second terminals of said electric motor are electrically connected to said minus and plus terminals, respectively, of said battery;

a switch assembly including first and second motor side contact elements electrically connected to said first and second terminals, respectively, of said electric motor, and first and second battery side contact elements electrically connected to said plus and minus terminals, respectively, of said battery, said first and second motor side contact elements being supported by one of said steering shaft and said rotation shaft and said first and second battery side contact elements being supported by the other of said steering shaft and said rotation shaft;

detecting means including a resistance element electrically connected at its one end and the other end to said plus and minus terminals, respectively, of said battery, and a slide contact element held in contact with said resistance element and slidably movable between said one end and said the other end of said resistance element, said slide contact element being supported by one of said steering shaft and said rotation shaft;

said first and second battery side contact elements of said switch assembly and said resistance element of said detecting means being supported respectively by the other of said steering shaft and said rotation shaft and circumferentially extending on a circumferential line around the center axis of said steering shaft and said rotation shaft; and a motor current control means for controlling the electric current supplied to said electric motor on the basis of the output of said detecting means in such a manner that the electric current supplied to said electric motor is varied in response to the output of said detecting means, wherein said steering shaft is rotatable with respect to said rotation shaft to assume three differential rotational positions consisting of a first rotational position in which said steering shaft is rotated in said first and second rotational directions with respect to said rotation shaft within the range of a second predetermined angle smaller than said first predetermined angle, a second rotational position in which said steering shaft is rotated in said first rotational direction with respect to said rotation shaft at a rotational angle beyond the range of said second predetermined angle, and a third rotational position in which said steering shaft is rotated in said second rotational direction with respect to said rotation shaft at a rotational angle beyond the range of said second predetermined angle, said first and second motor side contact elements being held in spaced and non-contact relationship to said first and second battery side contact elements when said steering shaft assumes said first rotational position, so that said electric motor is halted, said first and second motor side contact elements being respectively brought in contact with said first and second battery side contact elements when said steering shaft is rotated to assume said second rotational position, so that said electric motor is driven to rotate said rotation shaft in said first rotational direction, said first and second motor side contact elements being respectively brought in contact with said second and first battery side contact elements when said steering shaft is rotated to assume said third rotational position, so that said electric motor is driven to rotate said rotation shaft in said second rotational direction, and said slide contact element being held in contact with the middle portion of said resistance element when said steering shaft assumes said first rotational position, and said slide contact element being moved toward either said one end or said other end of said resistance element when said steering shaft is rotated in said first and second rotational directions with respect to said rotation shaft, so that the ratio of the voltage of said resistance element between said one end of said resistance element and said slide contact element to the voltage of said resistance element between said the other end of said resistance element and said slide contact element is varied in response to the rotation of said steering shaft in first and second rotational directions with respect to said rotation shaft.

2. An electrically power-assisted steering apparatus as set forth in claim 1, wherein said switch assembly further comprises:

a motor side contact support member operatively connected to said steering shaft so as to support said first and second motor side contact elements of said switch assembly, said motor side contact support member being rotated about its center axis by said steering shaft, and said first and second motor side contact elements being positioned on said circumferential line around the center axis of said motor side contact support member in spaced relationship to each other; and a battery side contact support member operatively connected to said rotation shaft so as to support said first and second battery side contact elements of said switch assembly and said slide contact element of said detecting means on said circumferential line, said first and second battery side contact elements arcuately extending on said circumferential line around said center axis of said motor side contact support member, said resistance element being provided between said pair of battery side contact terminals of said second battery side contact element and arcuately extending on said circumferential line in spaced relationship to said first and second battery side contact elements.

3. An electrically power-assisted steering apparatus comprising:

a steering shaft rotatable with a steering wheel and rotated about its center axis with respect to a vehicle body in opposite first and second rotational directions under the influence of steering torque applied to said steering wheel by a vehicle driver;

a rotation shaft operatively connected to front wheels of a vehicle and rotatable in said first and second rotational directions about its center axis which is in axial alignment with the center axis of said steering shaft;

resilient torque transmitting means including a spring for resiliently transmitting said steering torque from said steering shaft to said rotation shaft in a manner to permit said steering shaft to be rotated relatively with respect to said rotation shaft in said first and second rotational directions within the range of a first predetermined angle;

an electric motor having first and second terminals electrically connected selectively to plus and minus terminals, respectively, of a battery and to said minus and plus terminals, respectively, of said battery, said electric motor being operatively connected to said rotation shaft for assisting said steering torque applied to said steering wheel by said vehicle driver, said rotation shaft being rotated by said electric motor in said first rotational direction when said first and second terminals of said electric motor are electrically connected to said plus and minus terminals, respectively, of said battery, and said rotation shaft being rotated by said electric motor in said second rotational direction when said first and second terminals of said electric motor are electrically connected to said minus and plus terminals, respectively, of said battery;

a switch assembly including first and second motor side contact elements electrically connected to said first and second terminals, respectively, of said electric motor, and first and second battery side contact elements electrically connected to said plus and minus terminals, respectively, of said battery, said first and second motor side contact elements being supported by one of said steering shaft and said rotation shaft, and said first and second battery side contact elements being supported by the other of said steering shaft and said rotation shaft;

detecting means including a resistance element electrically connected at its one end and the other end to said plus and minus terminals, respectively, of said battery, and a slide contact element held in contact with said resistance element and slidably movable between said one end and said the other end of said resistance element, said slide contact element being supported by one of said steering shaft and said rotation shaft, said first and second battery side contact elements of said switch assembly and said resistance element of said detecting means being supported respectively by the other of said steering shaft and said rotation shaft and circumferentially extending on a circumferential line around the center axis of said steering shaft and said rotation shaft;

a torque detecting circuit electrically connected to said slide contact element for detecting the magnitude of said steering torque by measuring the ratio of the voltage of said resistance element between said one end of said resistance element and said slide contact element to the voltage of said resistance element between said the other end of said resistance element and said slide contact element; and a motor current control circuit electrically connected to said torque detecting circuit for controlling the electric current supplied to said electric motor on the basis of the magnitude of said steering torque detected by said torque detecting circuit in such a manner that the electric current supplied to said electric motor is increased in response to the increase of the detected magnitude of said steering torque;

wherein said steering shaft is rotatable with respect to said rotation shaft to assume three differential rotational positions consisting of a first rotational position in which said steering shaft is rotated in said first and second rotational directions with respect to said rotation shaft within the range of a second predetermined angle smaller than said first predetermined angle, a second rotational position in which said steering shaft is rotated in said first rotational direction with respect to said rotation shaft at a rotational angle beyond the range of said second predetermined angle, and a third rotational position in which said steering shaft is rotated in said second rotational direction with respect to said rotation shaft at a rotational angle beyond the range of said second predetermined angle, said first and second motor side contact elements being held in spaced and non-contact relationship to said first and second battery side contact elements when said steering shaft assumes said first rotational position, so that said electric motor is halted, said first and second motor side contact elements being respectively brought in contact with said first and second battery side contact elements when said steering shaft is rotated to assume said second rotational position, so that said electric motor is driven to rotate said rotation shaft in said first rotational direction, said first and second motor side contact elements being respectively brought in contact with said second and first battery side contact elements when said steering shaft is rotated to assume said third rotational position, so that said electric motor is driven to rotate said rotation shaft in said second rotational direction, said slide contact element being held in contact with the middle portion of said resistance element when said steering shaft assumes said first rotational position, and said slide contact element being moved toward one of said one end and said other end of said resistance element when said steering shaft is rotated in said first and second rotational directions with respect to said rotation shaft, so that the ratio of the voltage of said resistance element between said one end of said resistance element and said slide contact element to the voltage of said resistance element between said the other end of said resistance element and said slide contact element is varied in response to the increase of the rotation of said steering shaft in first and second rotational directions with respect to said rotation shaft.

4. An electrically power-assisted steering apparatus as set forth in claim 3, wherein said second battery side contact element of said switch assembly is constituted by a pair of battery side contact terminals, said switch assembly further comprising:

a motor side contact support member operatively connected to said steering shaft so as to support said first and second motor side contact elements and said slide contact element of said switch assembly, said motor side contact support member being rotated about its center axis by said steering shaft, said first and second motor side contact elements and said slide contact element being positioned on said circumferential line around the center axis of said motor side contact support member in spaced relationship to one another; and a battery side contact support member operatively connected to said rotation shaft so as to support said first and second battery side contact elements and said resistance element, said first and second battery side contact elements arcuately extending on said circumferential line around said center axis of said motor side contact support member in spaced relationship to each other, said resistance element being provided between said pair of battery side contact terminals of said second battery side contact element and arcuately extending on said circumferential line in spaced relationship to said first and second battery side contact elements, said first and second motor side contact elements being respectively positioned between one end portion of said first battery side contact element and one end portion of said second battery side contact element opposite to each other and between the other end portion of said first battery side contact element and the other end portion of said second battery side contact element opposite to each other when said steering shaft assumes said first rotational position.

5. An electrically power-assisted steering apparatus comprising:

a steering shaft rotatable with a steering wheel and rotated about its center axis with respect to a vehicle body in opposite first and second rotational directions under the influence of steering torque applied to said steering wheel by a vehicle driver:

a rotation shaft operatively connected to front wheels of a vehicle and rotatable in said first and second rotational directions about its center axis which is in axial alignment with the center axis of said steering shaft;

resilient torque transmitting means for resiliently transmitting said steering torque from said steering shaft to said rotation shaft in a manner to permit said steering shaft to be rotated relatively with respect to said rotation shaft in said first and second rotational directions within the range of a first predetermined angle;

a stationary gear casing fixedly mounted by said vehicle body to rotatably support said rotation shaft and said steering shaft, an electric motor having first and second terminals electrically connected selectively to plus and minus terminals, respectively, of a battery and to said minus and plus terminals, respectively, of said battery, said electric motor being operatively connected to said rotation shaft for assisting said steering torque applied to said steering wheel by said vehicle driver, said rotation shaft being rotated by said electric motor in said first rotational direction when said first and second terminals of said electric motor are electrically connected to said plus and minus terminals, respectively, of said battery, and said rotation shaft being rotated by said electric motor in said second rotational direction when said first and second terminals of said electric motor are electrically connected to said minus and plus terminals, respectively, of said battery;

a switch assembly including first and second motor side contact elements electrically connected to said first and second terminals, respectively, of said electric motor, and first and second battery side contact elements electrically connected to said plus and minus terminals, respectively, of said battery, said first and second motor side contact elements being supported by one of said steering shaft and said rotation shaft;

detecting means including a resistance element electrically connected at its one end and the other end to said plus and minus terminals, respectively, of said battery, and a slide contact element held in contact with said resistance element and slidably movable between said one end and said the other end of said resistance element, said slide contact element being supported by one of said steering shaft and said rotation shaft, said first and second battery side contact elements of said switch assembly and said resistance element of said detecting means being supported respectively by the other of said steering shaft and said rotation shaft and circumferentially extending on a circumferential line around the center axis of said steering shaft and said rotation shaft; and a motor current control means for controlling the electric current supplied to said electric motor on the basis of the output of said detecting means in such a manner that the electric current supplied to said electric motor is varied in response to the output of said detecting means, wherein said steering shaft is rotatable with respect to said rotation shaft to assume three differential rotational positions consisting of a first rotational position in which said steering shaft is rotated in said first and second rotational directions with respect to said rotation shaft within the range of a second predetermined angle smaller than said first predetermined angle, a second rotational position in which said steering shaft is rotated in said first rotational direction with respect to said rotation shaft at a rotational angle beyond the range of said second predetermined angle, and a third rotational position in which said steering shaft is rotated in said second rotational direction with respect to said rotation shaft at a rotational angle beyond the range of said second predetermined angle, said first and second motor side contact elements being held in spaced and non-contact relationship to said first and second battery side contact elements when said steering shaft assumes said first rotational position so that said electric motor is halted, said first and second motor side contact elements being respectively brought in contact with said first and second battery side contact elements when said steering shaft is rotated to assume said second rotational position, so that said electric motor is driven to rotate said rotation shaft in said first rotational direction, said first and second motor side contact elements being respectively brought in contact with said second and first battery side contact elements when said steering shaft is rotated to assume said third rotational position, so that said electric motor is driven to rotate said rotation shaft in said second rotational direction, and said slide contact element being held in contact with the middle portion of said resistance element when said steering shaft assumes said first rotational position, and said slide contact element being moved toward either said one end or said the other end of said resistance element when said steering shaft is rotated in said first and second rotational directions with respect to said rotation shaft, so that the ratio of the voltage of said resistance element between said one end of said resistance element and said slide contact element to the voltage of said resistance element between said the other end of said resistance element and said slide contact element is varied in response to the rotation of said steering shaft in first and second rotational directions with respect to said rotation shaft, and wherein said resilient torque transmitting means comprises:

an input flange fixedly supported by a longitudinal end portion of said steering shaft to radially extend from said steering shaft and formed with at least a guide slot arcuately extending around the center axis of said steering shaft and at least an oblong spring slot having a center axis extending in parallel relationship to the center axis of said steering shaft, a short axis directed toward the center axis of said steering shaft and passing through the center axis of said oblong spring slot, and a long axis passing through the center axis of said oblong spring slot in perpendicular relationship to said short axis of said oblong spring slot;

a first output flange securely connected to said rotation shaft in facing and spaced relationship to one of the side surfaces of said input flange and is formed with at least an oblong spring slot having a center axis extending in parallel relationship to the center axis of said steering shaft, a short axis directed toward the center axis of said steering shaft and passing through the center axis of said oblong spring slot of said first output flange, and a long axis passing through the center axis of said oblong spring slot of said first output flange in perpendicular relationship to said short axis of said oblong spring slot of said first output flange and being equal in length to the long axis of said oblong spring slot of said input flange, and the center axis of said oblong spring slot of said first output flange being brought into axial alignment with the center axis of said oblong spring slot of said input flange when said steering shaft is rotated to assume said first rotational position;

a second output flange disposed in opposing relationship to said first output flange through said input flange and in facing and spaced relationship to the other of the side surfaces of said input flange, said second output flange being formed with at least an oblong spring slot having a center axis extending in parallel relationship to the center axis of said steering shaft, a short axis directed toward the center axis of said steering shaft and passing through the center axis of said oblong spring slot of said second output flange, and a long axis passing through the center axis of said oblong spring slot of said second output flange in perpendicular relationship to said short axis of said oblong spring slot of said second output flange and being equal in length to the long axis of said oblong spring slot of said input flange, and the center axis of said oblong spring slot of said second output flange being brought into axial alignment with the center axes of said oblong spring slots of said input flange and said first output flange when said steering shaft is rotated to assume said first rotational position;

at least a guide pin slidably received in said arcuate guide slot and having longitudinal end portions securely connected to said first and second output flanges, respectively, to force said second output flange to be rotated in unison with said first output flange when said first output flange is rotated by said rotation shaft with respect to said vehicle body; and at least a helical compression spring received in said oblong spring slots of said input flange and first and second output flanges with its center axis being in axial alignment with the long axis of said input flange and with its opposite ends being in pressing engagement with the opposing inner faces of said oblong spring slot of said input flange and the opposing inner faces of said oblong spring slots of said first and second output flanges.

6. An electrically power-assisted steering apparatus comprising:

a steering shaft rotatable with a steering wheel and rotated about its center axis with respect to a vehicle body in opposite first and second rotational directions under the influence of steering torque applied to said steering wheel by a vehicle driver;

a rotation shaft operatively connected to front wheels of a vehicle and rotatable in said first and second rotational directions about its center axis which is in axial alignment with the center axis of said steering shaft;

resilient torque transmitting means for resiliently transmitting said steering torque from said steering shaft to said rotation shaft in a manner to permit said steering shaft to be rotated relatively with respect to said rotation shaft in said first and second rotational directions within the range of a first predetermined angle;

a stationary gear casing fixedly mounted by said vehicle body to rotatably support said rotational shaft and said steering shaft, an electric motor having first and second terminals electrically connected selectively to plus and minus terminals, respectively, of a battery and to said minus and plus terminals, respectively, of said battery, said electric motor being operatively connected to said rotation shaft for assisting said steering torque applied to said steering wheel by said vehicle driver, said rotation shaft being rotated by said electric motor in said first rotational direction when said first and second terminals of said electric motor are electrically connected to said plus and minus terminals, respectively, of said battery, and said rotation shaft being rotated by said electric motor in said second rotational direction when said first and second terminals of said electric motor are electrically connected to said minus and plus terminals, respectively, of said battery;

a rotatable motor casing disposed between said resilient torque transmitting means and said rotation shaft in axial alignment with said steering shaft and said rotation shaft to accommodate said electric motor therein, said rotatable motor casing being securely connected at its one end portion to said resilient torque transmitting means and at its the other end portion to one end portion of said rotation shaft for transmitting the steering torque from the resilient torque transmitting means to said rotation shaft;

a first planetary gear assembly being constituted by an externally toothed sun gear securely coupled with an output shaft of said electric motor in axial alignment with the output shaft of said electric motor, a plurality of pinion gears held in mesh with the externally toothed sun gear and rotatably supported on said one end portion of said rotation shaft in equi-angularly spaced relationship to each other, an internally toothed ring gear held in mesh with said pinion gears, and a connecting member having a radially outward portion secured to said internally toothed ring gear;

a second planetary gear assembly being constituted by an externally toothed sun gear securely connected through said connecting member to said internally toothed ring gear of said first planetary gear assembly to be rotated together with said internally toothed ring gear of said first planetary gear assembly, a plurality of pinion gears held in mesh with said externally toothed sun gear of said second planetary gear assembly and each rotatably supported on said vehicle body, an internally toothed ring gear held in mesh with said pinion gears, and a connecting member having a radially outward portion secured to the internally toothed ring gear and a radially inward portion secured to a longitudinally intermediate portion of the rotation shaft;

a switch assembly including first and second motor side contact elements electrically connected to said first and second terminals, respectively, of said electric motor, and first and second battery side contact elements electrically connected to said plus and minus terminals, respectively, of said battery, said first and second motor side contact elements being supported by one of said steering shaft and said rotation shaft;

detecting means including a resistance element electrically connected at its one end and the other end to said plus and minus terminals, respectively, of said battery, and a slide contact element held in contact with said resistance element and slidably movable between said one end and said the other end of said resistance element, said slide contact element being supported by one of said steering shaft and said rotation shaft, said first and second battery side contact elements of said switch assembly and said resistance element of said detecting means being supported respectively by the other of said steering shaft and said rotation shaft and circumferentially extending on a circumferential line around the center axis of said steering shaft and said rotation shaft; and a motor current control means for controlling the electric current supplied to said electric motor on the basis of the output of said detecting means in such a manner that the electric current supplied to said electric motor is varied in response to the output of said detecting means, wherein said steering shaft is rotatable with respect to said rotation shaft to assume three differential rotational positions consisting of a first rotational position in which said steering shaft is rotated in said first and second rotational directions with respect to said rotation shaft within the range of a second predetermined angle smaller than said first predetermined angle, a second rotational position in which said steering shaft is rotated in said first rotational direction with respect to said rotation shaft at a rotational angle beyond the range of said second predetermined angle, and a third rotational position in which said steering shaft is rotated in said second rotational direction with respect to said rotation shaft at a rotational angle beyond the range of said second predetermined angle, said first and second motor side contact elements being held in spaced and non-contact relationship to said first and second battery side contact elements when said steering shaft assumes said first rotational position, so that said electric motor is halted, said first and second motor side contact elements being respectively brought in contact with said first and second battery side contact elements when said steering shaft is rotated to assume said second rotational position so that said electric motor is driven to rotate said rotation shaft in said first rotational direction, said first and second motor side contact elements being respectively brought in contact with said second and first battery side contact elements when said steering shaft is rotated to assume said third rotational position, so that said electric motor is driven to rotate said rotation shaft in said second rotational direction, and said slide contact element being held in contact with the middle portion of said resistance element when said steering shaft assumes said first rotational position, and said slide contact element being moved toward either said one end or said the other end of said resistance element when said steering shaft is rotated in said first and second rotational directions with respect to said rotation shaft, so that the ratio of the voltage of said resistance element between said one end of said resistance element and said slide contact element to the voltage of said resistance element between said the other end of said resistance element and said slide contact element is varied in response to the rotation of said steering shaft in first and second rotational directions with respect to said rotation shaft.

\* \* \* \* \*